(12) United States Patent
Cornelius et al.

(10) Patent No.: US 7,908,886 B2
(45) Date of Patent: Mar. 22, 2011

(54) OXYHALIDE GLASS FINING

(75) Inventors: Lauren Kay Cornelius, Painted Post, NY (US); Adam James Ellison, Painted Post, NY (US); Shari Elizabeth Koval, Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 363 days.

(21) Appl. No.: 12/072,012

(22) Filed: Feb. 22, 2008

(65) Prior Publication Data

US 2009/0215608 A1    Aug. 27, 2009

(51) Int. Cl.
*C03B 5/00* (2006.01)
*C03B 5/16* (2006.01)
*C03C 6/00* (2006.01)
*C03C 6/02* (2006.01)
*C03C 6/06* (2006.01)
*C03C 3/083* (2006.01)

(52) U.S. Cl. .......... 65/134.3; 65/134.1; 501/27; 501/30; 501/68

(58) Field of Classification Search ............... 501/27, 501/30, 68; 65/134.1, 134.3
See application file for complete search history.

(56) References Cited

U.S. PATENT DOCUMENTS

| | | | | |
|---|---|---|---|---|
| 2,009,763 | A * | 7/1935 | Dalton | 501/30 |
| 6,992,031 | B2 | 1/2006 | Naumann et al. | 3/85 |
| 2004/0018934 | A1 | 1/2004 | Ott et al. | 3/91 |
| 2006/0242995 | A1* | 11/2006 | Bookbinder et al. | 65/134.1 |
| 2008/0132399 | A1* | 6/2008 | Aitken et al. | 501/27 |

FOREIGN PATENT DOCUMENTS

| | | | | |
|---|---|---|---|---|
| BE | 396713 | | 7/1933 | |
| BE | 396713 | A * | 7/1933 | |
| CA | 349755 | A * | 4/1935 | |
| DE | 102005018607 | | 10/2006 | |
| JP | 05-306140 | | 11/1993 | 3/11 |
| JP | 10-025132 | | 1/1998 | 4/20 |
| JP | 10-324526 | | 12/1998 | 5/225 |

* cited by examiner

*Primary Examiner* — Karl E Group
*Assistant Examiner* — Noah S Wiese

(57) ABSTRACT

The invention is directed to oxyhalide fining agents for glass and processes for making glass using such a fining agent.

19 Claims, No Drawings

OXYHALIDE GLASS FINING

TECHNICAL FIELD

The present invention relates to fining agents for glass and the improved glass that results from such fining.

BACKGROUND

The glass substrate used for various end uses, such as LCD substrates, must be as nearly free of defects as possible. One of the most pernicious defects is gas-filled bubbles, commonly referred to as seeds or blisters. When in the body of the glass, bubbles can refract light, thus distorting the image. For LCD substrates, when at the surface, the bubbles deform the transistor itself, and thus compromise the performance of the entire device.

The process of removing gaseous inclusions from a melt is referred to as fining or refining, and chemical constituents added to produce a fining effect are called fining agents. LCD substrates have been manufactured in the art using oxides or acids of arsenic as a fining agent. Represented as $As_2O_5$, this commonly constitutes 0.9-1.1 wt % of the glass. It is believed to achieve bubble-free glass by reducing from +5 to +3 at high temperature, after most melting is complete. This reduction releases oxygen, which fills remaining bubbles and causes them to rise out of the glass. Arsenic is an outstanding fining agent, producing virtually bubble-free glass with very little process intervention. Unfortunately, it is also a toxic element, one of the eight listed heavy metals in the Resource Conservation and Recovery Act (RCRA). The processing of the glass surface results in arsenic-bearing waste that is expensive to process. Furthermore, "cradle-to-grave" responsibility for generating arsenic-containing glass is a potential burden.

Antimony oxide ($Sb_2O_3$) is also used as a fining agent. However, it is much less effective than arsenic oxide, because it loses its oxygen at lower temperature, before melting is complete. Furthermore, antimony is closely related to arsenic in terms of its chemical behavior, and so, poses many of the same challenges for waste streams.

Tin oxide ($SnO_2$) is not toxic and has been used as a fining agent. But its very low solubility at the forming temperature of LCD glasses (~0.15 wt %) limit how much can be added, and therefore, compromises its efficacy.

There is a need to address the aforementioned problems and other shortcomings associated with the traditional fining agents and the traditional approaches for fining glass. These needs and other needs are satisfied by the fining agent technology of the present invention.

SUMMARY

The present invention relates to a fining agent, a process of using the fining agent in a glass production process, and the resultant glass. The present invention addresses at least a portion of the problems described above through the use of a novel fining agent. Specifically, the invention relates to the use of an oxyhalide compound or a hydrate thereof as a fining agent in a glass manufacturing process. The oxyhalide compound or a hydrate thereof can be used alone or in combination with a halide compound or a hydrate thereof. Other fining agents, such as, for example, tin oxides, can also be used in conjunction with the oxyhalide compound.

In a first detailed aspect, the present invention provides a method for producing a silicate glass comprising
   forming a silicate glass batch;
   melting and fining the silicate glass batch; and
   forming the silicate glass,
   wherein the fining is performed with a sufficient amount of a fining agent comprising one or more oxyhalide compounds or a hydrate thereof.

In a second detailed aspect, the present invention further provides a silicate glass batch comprising
   (i) a silicate component, and
   (ii) a sufficient amount of a fining agent comprising one or more oxyhalide compounds or a hydrate thereof.

In a third detailed aspect, the present invention provides a silicate glass comprising a defect level of less than or equal to one gaseous occlusion greater than 50 microns per 1 pound of glass.

Additional aspects, embodiments, and advantages of the invention will be set forth, in part, in the detailed description and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

DETAILED DESCRIPTION

The present invention can be understood more readily by reference to the following detailed description, examples, and claims, and their previous and following description. However, before the present compositions, articles, devices, and/or methods are disclosed and described, it is to be understood that this invention is not limited to the specific compositions, articles, devices, and/or methods disclosed unless otherwise specified, as such can, of course, vary. It is also to be understood that the terminology used herein is for the purpose of describing particular aspects or embodiments only and is not intended to be limiting.

The following description of the invention is provided as an enabling teaching of the invention in its currently known embodiments. To this end, those skilled in the relevant art will recognize and appreciate that many changes can be made to the various aspects and embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and/or components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects and embodiments of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "compound" includes aspects and embodiments having two or more such compounds, unless the context clearly indicates otherwise.

"Optional" or "optionally" means that the subsequently described event or circumstance can or cannot occur, and that the description includes instances where the event or circumstance occurs and instances where it does not. For example, the phrase "optionally substituted component" means that the component can or can not be substituted and that the description includes both unsubstituted and substituted aspects and embodiments of the invention.

Ranges can be expressed herein as from "about" one particular value, and/or to "about" another particular value. When such a range is expressed, another aspect or embodiment includes from the one particular value and/or to the other particular value. Similarly, when values are expressed as approximations, by use of the antecedent "about," it will be understood that the particular value forms another aspect or embodiment. It will be further understood that the endpoints of each of the ranges are significant both in relation to the other endpoint, and independently of the other endpoint.

As used herein, a "wt. %" or "wt %" or "weight percent" or "percent by weight" of a component, unless specifically stated to the contrary, refers to the ratio of the weight of the component to the total weight of the composition in which the component is included, expressed as a percentage.

As used herein, a "mole percent" or "mole %" or "mol %" or "mol %" of a component, unless specifically stated to the contrary, refers to the ratio of the number of moles of the component to the total number of moles of the composition in which the component is included, expressed as a percentage.

As used herein, the term oxyhalide compound includes the non-hydrated form as well as the hydrated form. As used herein, a halide compound includes the non-hydrated form as well as the hydrated form. A halide compound, which includes a cation, should be distinguished from the term "halide," which does not intend a cation.

As briefly introduced above, the present invention provides for the use of an oxyhalide compound as a fining agent in a glass manufacturing process. The oxyhalide compound can be used alone or in combination with a halide compound.

Fining Agent

The fining agent of the invention comprises one or more oxyhalide compounds or a hydrate thereof. Any oxyhalide compound that releases oxygen and halide in the fining phase of the silicate glass manufacturing process and that is compatible with the silicate glass can be used. In a specific embodiment, the one or more oxyhalide compounds or a hydrate thereof is independently of the formula $R_a(XO_p)_q \cdot r(H_2O)$, where $R_a$ is a cation; X is a halide of Cl, Br, or I; p is an integer and is the number of oxygen atoms in the oxyhalide compound; q is an integer and is equal to the valance state of $R_a$; and r is greater than or equal to 0 and is the number of waters of hydration in the oxyhalide compound. The variable r can be an integer or a non-integer (fractional).

The halide "X" in the oxyhalide compound is chlorine, bromine, or iodine. The number of oxygen atoms, p, can be, for example, 1, 2, 3, or 4. In specific embodiments, p is 1 or 3. The variable q can be, for example, 1, 2, 3, or 4. The variable r varies depending on the number of waters of hydration. In certain embodiments, r is 0, 1, 2, 4, 6, or 8. In various embodiments, $XO_p$ of the oxyhalide compound is, for example and without limitation, $ClO$, $ClO_2$, $ClO_3$, $ClO_4$, $BrO_3$, or $IO_3$.

The cation $R_a$ is any cation that is operative with the oxyhalide compound of the invention and is compatible with the silicate glass. The list of cations that can serve as "carrying agents" for the oxyhalides and/or halides includes, but is not limited to, the alkalis (Li, Na, K, Rb, Cs), the alkaline earths (Mg, Ca, Sr, Ba), zinc, tin, aluminum, lanthanum, yttrium, zirconium, titanium, bismuth, and the transition metals. Even if an alkali cation is utilized in the fining agent, the amount of alkali cation residing in the final glass product can still be an acceptable amount in an alkali-free glass such that it does not affect the final performance properties of the alkali-free glass. Transition metals should be avoided if the objective is to obtain glass substantially free of color. In one embodiment, the cation is magnesium, calcium, or strontium.

In various embodiments, the oxyhalide compound can be a hypochlorite, chlorite, bromate, or iodate of an alkali or alkaline earth or a hydrate thereof. In various specific embodiments, the oxyhalide compound is, for example, $NaClO$, $NaBrO_3$, $NaIO_3$, $KClO$, $KBrO_3$, $KIO_3$, $RbClO$, $RbBrO_3$, $RbIO_3$, $CsClO$, $CsBrO_3$, $CsIO_3$, $Ca(ClO)_2$, $Ca(ClO)_2 \cdot H_2O$, $Ca(ClO_2)_2$, $Ca(ClO_3)_2$, $Ca(ClO_4)_2$, $Ca(BrO_3)_2$, $Ca(BrO_3)_2 \cdot H_2O$, $Ca(IO_3)_2$, $Ca(IO_3)_2 \cdot H_2O$, $Ca(IO_3)_2 \cdot 6H_2O$, $Mg(ClO)_2$, $Mg(ClO_3)_2 \cdot 6H_2O$, $Mg(ClO_4)_2$, $Mg(ClO_4)_2 \cdot 6H_2O$, $Mg(BrO_3)_2 \cdot 6H_2O$, $Mg(IO_3)_2 \cdot 4H_2O$, $Sr(ClO)_2$, $Sr(BrO_3)_2$, $Sr(IO_3)_2$, $Sr(IO_3)_2 \cdot H_2O$, $Ba(ClO)_2$, $Ba(BrO_3)_2$, $Ba(IO_3)_2$, $Ba(IO_3)_2 \cdot H_2O$, or various other hydrates thereof.

The halide compound is an optional compound that can be used along with the oxyhalide compound. Any halide compound that releases halide in the fining phase of the silicate glass manufacturing process and that is compatible with the silicate glass can be used. In a specific embodiment, the one or more halide compounds or a hydrate thereof is independently of the formula $R_b(Y)_t \cdot u(H_2O)$, where $R_b$ is a cation; Y is a halide of F, Cl, Br, or I; t is an integer and is equal to the valance state of $R_b$; and u is greater than or equal to 0 and is the number or waters of hydration in the halide compound. The variable u can be in integer or a non-integer (fractional).

The halide "Y" in the halide compound is a halide of F, Cl, Br, or I. The variable t is, in various embodiments, 1, 2, 3, or 4. In specific embodiments t is 1 or 2. The variable u varies depending on the number of waters of hydration. In certain embodiments, u is 0, 2, 6, or 8.

The cation $R_b$ is any cation that is operative with the halide compound of the invention and is compatible with the silicate glass. In certain embodiments, the cation is independently selected from the same cations listed above for the oxyhalide compound. In one embodiment, the cation is magnesium or calcium.

In various embodiments, the halide compound is a fluoride, chloride, bromide, or iodide of an alkali, alkaline earth, or aluminum or a hydrate thereof. In various specific embodiments, the halide compound is, for example, NaF, NaCl, NaBr, NaI, KF, KCl, KBr, KI, RbF, RbCl, RbBr, RbI, CsF, CsCl, CsBr, CsI, $CaF_2$, $CaCl_2$, $CaCl_2.H_2O$, $CaCl_2.2H_2O$, $CaCl_2.4H_2O$, $CaCl_2.6H_2O$, $CaBr_2$, $CaBr_2.6H_2O$, $CaBr_2.6H_2O$, $CaI_2$, $CaI_2.6H_2O$, $MgF_2$, $MgCl_2$, $MgCl_2.6H_2O$, $MgBr_2$, $MgI_2$, $MgI_2.H_2O$, $SrCl_2$, $SrCl_2.2H_2O$, $SrBr_2$, $SrBr_2.2H_2O$, $SrI_2$, $SrI_2.xH_2O$, $BaF_2$, $BaCl_2$, $BaCl_2.2H_2O$, $BaBr_2$, $BaBr_2.2H_2O$, $BaI_2$, $BaI_2.xH_2O$, $AlF_3$, $AlF_3.6H_2O$, $AlCl_3$, $AlCl_3.6H_2O$, $AlBr_3$, $AlBr_3.6H_2O$, $AlI_3$, $AlI_3.6H_2O$, $ZnF_2$, $ZnF_2.4H_2O$, $ZnCl_2$, $ZnCl_2.xH_2O$, $ZnBr_2$, $ZnBr_2.xH_2O$, $ZnI_2$, or $ZnI_2.xH_2O$, or various other hydrates thereof. In one embodiment, the halide compound is $CaF_2$, $CaCl_2$, $CaCl_2.4H_2O$, NaF, NaCl, NaBr, NaI, KF, KCl, KBr, or KI.

In another embodiment, the combination of an oxyhalide and a halide is used, wherein the one or more oxyhalide compounds independently comprises a hypochlorite, bromate, or iodate of an alkali or alkaline earth or a hydrate thereof and the one or more halide compounds independently comprises a fluoride, chloride, bromide or iodide of an alkali, alkaline earth, or aluminum or a hydrate thereof.

It has been found that combinations of a hypochlorite and a bromate (or a hydrate of any thereof), and combinations of a hypochlorite and an iodate (or a hydrate of any thereof) are particularly advantageous in certain embodiments. In other specific embodiments, the fining agent comprises an oxyhalide and a fluoride; an oxyhalide and a bromide; or an oxyhalide and a chloride, wherein any of the oxyhalide, fluoride, bromide, or chloride can be the hydrate thereof. In these other specific embodiments, in further embodiments, the oxyhalide comprises a hypochlorite, an iodate, or a combination thereof, or a hydrate thereof. In a specific embodiment, the fining agent comprises a hypochlorite, an iodate, a bromate, and a fluoride, or a hydrate of any thereof.

One or more of the oxyhalide compounds or hydrates thereof can be utilized. That is, oxyhalides or a hydrate thereof having different cations with the same halide, or oxyhalide compounds having the same cation but different halide, or oxyhalides having a different cation and a different halide can be utilized. One, two, three, or even four or more oxyhalide compounds can be utilized in the invention.

Likewise, the one or more halide compounds or a hydrate thereof can be one, two, three, or even four or more halide compounds or a hydrate thereof with the same or different cation and/or the same or different halide anion in the halide compound. Additionally, as between the oxyhalide and halide compounds, the cations of each can be the same or different, and the halides can be the same or different.

In certain embodiments, the fining agent comprises one oxyhalide compound. In certain other embodiments, the fining agent comprises two or more, such as two, three, or four, oxyhalide compounds. In another embodiment, the fining agents comprise three or more, such as three or four, oxyhalide compounds. In another embodiment, the fining agent comprises one oxyhalide compound and one halide compound. In another embodiment, the fining agent comprises two or more, such as two, three, or four, oxyhalide compounds and one halide compound. In another embodiment, the fining agent comprises three oxyhalide compounds and one halide compound.

In addition to the fining agent being an oxyhalide compound and optionally a halide compound, the fining agent can further comprise additional types of fining agents. In certain embodiments, any other fining agent can be used in combination with the fining agent of the invention. Such additional types of fining agents can be, for example, a tin type fining agent, such as $SnO_2$. In certain embodiments, fining can be improved by adding small amounts of $SnO_2$, on the order of from about 0.02 wt % to about 0.5 wt %, in certain embodiments 0.02-0.4 wt %, in certain other embodiments 0.02-0.3 wt %, of the final glass composition. Other fining agents can include, for example, antimony oxide, arsenic oxide, or sulfate fining agents. When used, $As_2O_3$ and $Sb_2O_3$ are, in one embodiment, used in an amount of from about 0.05 to about 2 wt % and sulfate is, in one embodiment, used up to about 1 wt % batched weight. In one embodiment, the batch composition to make the glass is substantially free of antimony oxide or arsenic oxide fining agents other than unavoidable impurities, such as, less than 0.05 wt % antimony oxide or arsenic oxide fining agents.

The halide or sulfate compound can be delivered neat in the batch mixture or it can be incorporated into a glass melt, such as borate glass melt, which is then formed into a solid product and ground up and delivered as a frit composition to the batch mixture. For example, in one embodiment, the halide(s) may be combined with (i) $B_2O_3$, (ii) ZO (where Z represents alkaline earth) and (iii) $SiO_2$ or $Al_2O_3$, or any other constituents of the base glass or constituents compatible with the base glass, melted to form a frit material first, and the frit is then included into the batch mixture for melting. In this approach, sufficient amount of halide should be used in the starting materials for the frit such that sufficient amount of halide is retained in the frit to be introduced into the batch mixture. Exemplary combinations of materials for the frit include, but are not limited to: $B_2O_3+CaO+MgO+SiO_2+CaBr_2+CaF_2$; $B_2O_3+CaO+CaBr_2$; $B_2O_3+CaO+CaSO_4+SiO_2$; or $B_2O_3+CaO+CaSO_4+SiO_2$.

Glass

Any silicate glass that utilizes a fining agent is contemplated by this invention. By "silicate glass" is meant a glass comprising $SiO_2$ in the glass network. The glass may comprise, in addition, $B_2O_3$, $Al_2O_3$, $A_2O$, ZO, and other oxides and halides, where A represent alkali, and Z represents alkaline earth, Zn, and Pb. In one embodiment, the glass is substantially free of alkalis, also commonly referred to as an alkali-free glass. In another embodiment, the glass does not have to be substantially free of alkalis and can contain, for example, more than 1,000 ppm alkalis. Not intending to be limiting, other specific examples of glasses include, for example, low boron glasses, alkali aluminosilicates, alkali zinc silicates, alkali borosilicates, alkali boroaluminosilicates, alkaline earth aluminosilicates, alkaline earth boroaluminosilicates, and alkaline earth zinc aluminosilicates (green glasses for beta-quartz glass ceramics).

In various embodiments, the silicate glass batch further comprises, for example, oxides, carbonates, hydroxides, nitrates, carboxylates, halides, borates, aluminates, silicates, phosphates of the alkali or alkaline-earth elements, and/or oxides, hydroxides, nitrates or halides or combinations thereof of the elements silicon, boron or aluminum. The silicate glass may have a composition, expressed in terms of weight percentages of oxides, comprising: 55-88% $SiO_2$; 0-28% $B_2O_3$; 0-30% $Al_2O_3$, 0-30% $A_2O$, and 0-30% ZO, where A represents alkali, and Z represents alkaline earth, zinc and lead. In certain embodiments, the glass may have a composition, expressed in terms of weight percentage in terms of oxides, comprising: 56-85% $SiO_2$; 0-16% $B_2O_3$; 8-25% $Al_2O_3$, 0-25% $A_2O$, and 0-25% ZO, where A represents alkali, and Z represents alkaline earth. In certain specific embodiments of these embodiments of glasses having the specified composition, the glass may be advantageously essentially free of alkali (such as comprising less than about 1000 ppm by weight of alkali). Being essentially free of alkali is particularly advantageous for TFT LCD glass substrates.

Process

The fining agent of the present invention can be used in any typical process for producing a silicate glass. In producing a silicate glass, the process generally involves forming a silicate glass batch containing the requisite glass raw materials. This is performed by admixing the raw materials in a vessel. To this glass batch at any stage of the glass batch production is added a fining agent. Then the glass batch containing the fining agent is melted and fined. The fining can take place during the melting process or subsequent to the melting process. After fining, the glass material is formed into a final silicate glass product. Exemplary forming processes include, but are not limited to, fusion draw, float process, molding, pressing, and the like.

The fining agent is, in one embodiment, added during the batching step prior to the melting step. It can also be added after the batching step, that is, during the melting or fining step, but this is not as practical and efficient as adding the fining agent during the batching step.

One aspect of the invention provides a silicate glass batch comprising
(i) a silicate component, and
(ii) a sufficient amount of a fining agent comprising one or more oxyhalide compounds or a hydrate thereof.
In this glass batch aspect, the fining agent can further comprise one or more halide compounds or a hydrate thereof.

Because a by-product of the oxyhalide compound and halide compound is a halide gas, a proper effluent handling system should be utilized to prevent the build-up of halide gas. During the melt step, the melt apparatus can have a gas head space. This will provide for a place for the halide and oxygen gas to escape from the system.

The amount of oxyhalide compound and halide compound added to the glass batch to produce an effective final product varies depending upon various parameters, such as the particular glass batch components utilized, the process temperature, the presence or absence of other fining agents, etc. However, in one embodiment, if the amount of the fining agent is controlled such that the formed silicate glass has a residual halide in the amount of at least 50 ppm halide, then the final product will have excellent properties. In another embodiment, the amount of residual halide in the final glass product is at least 75 ppm. In another embodiment, the residual halide is at least 100 ppm.

In one embodiment, if enough fining agent of the present invention is added to the process, the resulting silicate glass comprises a defect level of less than or equal to one gaseous inclusion greater than 50 microns per one pound of glass. In another embodiment, the defect level is less than or equal to one gaseous inclusion greater than 50 microns per 20 pounds of formed glass.

In another embodiment, the defect level of the formed silicate glass is less than or equal to one gaseous inclusion greater than 50 microns per consecutive one pound of formed glass. Consecutive one pound of formed glass is intended to mean that one consecutive pound produced from the process line is measured and meets the standard of less than or equal to one gaseous inclusion greater than 50 microns. In another embodiment, the defect level of the formed silicate glass is less than or equal to one gaseous inclusion greater than 50 microns per 20 pounds of consecutively formed glass, per 50 pounds of consecutively formed glass, per 100 pounds of consecutively formed glass, or per 500 pounds of consecutively formed glass.

The starting amount of the oxyhalide compound in the glass batch can vary widely depending on various conditions. In one embodiment, the amount of oxyhalide compound that is used in the glass batch can be from 0.01 wt % to 3 wt % halide batched as oxyhalide to achieve the end result of at least 50 ppm residual halide. In certain embodiments, no more than a total of 0.2 wt % of the oxyhalide compound and halide compound is added to the batch. Amounts higher than 0.2 wt % tend to cause the fining agent to act like a major component, which is detrimental. Higher amounts can affect the properties of the glass and can add appreciably to the off-gas handling problems.

Depending upon the cation used and the system conditions, the cation may volatize or be retained within the glass product.

The advantages of using an oxyhalide compound alone or in combination with a halide compound are as follows. Oxygen from the oxyhalide is released in an early stage of the fining process. Conversely, the halide from the oxyhalide compound and/or from the optional halide compound can be made to release at a later stage in the fining process, for example, by raising the temperature of the process. Therefore, both an early and a late stage fining can be achieved, thereby producing higher quality end glass product with less defects.

The present invention eliminates the need for an arsenic or antimony fining agent, both of which are toxic heavy metals. Additionally, the present invention provides superior performance over the inferior fining activity of a low tin oxide concentration, producing low defect levels in a short amount of time. At the levels employed, the halides do not affect the material properties of the glass.

Although several aspects and embodiments of the present invention have been described in the detailed description, it should be understood that the invention is not limited to the aspects and embodiments disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the compositions, articles, devices, and/or methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Bromide+Iodate as a Fining Package

A batch was prepared with the following constituents:

TABLE 1

| Compound | Form | Mass (g) |
| --- | --- | --- |
| $SiO_2$ | 120 mesh sand | 574 |
| $Al_2O_3$ | 325 mesh powder | 151 |
| $B(OH)_3$ | Technical grade powder | 168 |
| MgO | Powder | 0.8 |
| $CaCO_3$ | crushed limestone | 120.2 |
| $CaBr_2$ | reagent powder | 11.5 |
| $Ca(IO_3)_2 \cdot H_2O$ | reagent powder | 11.6 |
| $SrCO_3$ | reagent powder | 10.2 |
| $SnO_2$ | Powder | 1.4 |

In this batch, $CaBr_2$ is about 0.4 mol %, $Ca(IO_3)_2.H_2O$ is about 0.2 mol %, and $SnO_2$ is about 0.07 mol %. The batch was vigorously mixed in a plastic jar using a Turbula mixer. It was then transferred to a platinum crucible with an internal volume of approximately 650 cc. The crucible was directly loaded into a glowbar furnace at 1650° C. and held for 6 hours. After this time, the glass was poured into a patty and annealed at 725° C.

Example 2

Iodate+Fluoride as a Fining Package

A batch was prepared with the following constituents:

TABLE 2

| Compound | Form | Mass (g) |
| --- | --- | --- |
| $SiO_2$ | 120 mesh sand | 572 |
| $Al_2O_3$ | 325 mesh powder | 150 |
| $B(OH)_3$ | Technical grade powder | 168 |
| MgO | Powder | 0.26 |
| $CaCO_3$ | crushed limestone | 126 |
| $Ca(IO_3)_2 \cdot H_2O$ | reagent powder | 11.1 |
| $CaF_2$ | crushed fluorospar | 2.2 |
| $SrCO_3$ | reagent powder | 10.2 |
| $SnO_2$ | Powder | 1.4 |

In this batch, $Ca(IO_3)_2.H_2O$ and $CaF_2$ are about 0.2 mol % each and $SnO_2$ is about 0.07 mol %. The batch is mixed and melted as in Example 2.

Example 3

Hypochlorite as a Fining Package

A batch was prepared with the following constituents:

TABLE 3

| Compound | Form | Mass (g) |
| --- | --- | --- |
| $SiO_2$ | 120 mesh sand | 383 |
| $Al_2O_3$ | 325 mesh powder | 100.6 |
| $B(OH)_3$ | technical grade powder | 112 |
| MgO | Powder | 0.69 |
| $CaCO_3$ | crushed limestone | 84.5 |
| $SrCO_3$ | reagent powder | 6.84 |
| $SnO_2$ | Powder | 0.97 |
| $Ca(ClO)_2$ | Powder | 0.66 |

In this batch, $Ca(ClO)_2$ is about 0.05 mol % and $SnO_2$ is about 0.07 mol %. The batch was vigorously mixed in a plastic jar using a Turbula mixer. It was then transferred to a refractory silica crucible with an internal volume of approximately 650 cc. The crucible was directly loaded into a furnace with molydisilicide elements at 1600° C. and held for 2 hours. After this time, the crucible was removed from the furnace, and the glass was left to cool to room temperature in the crucible.

Example 4

Combination of Oxyhalides as a Fining Package

A batch was prepared with the following constituents:

TABLE 4

| Compound | Form | Mass (g) |
| --- | --- | --- |
| $SiO_2$ | 120 mesh sand | 366.2 |
| $Al_2O_3$ | 325 mesh powder | 96.23 |
| $B(OH)_3$ | technical grade powder | 107.26 |
| MgO | powder | 0.66 |
| $CaCO_3$ | crushed limestone | 80.29 |
| $SrCO_3$ | reagent powder | 6.54 |
| $SnO_2$ | powder | 0.93 |
| $Ca(ClO)_2$ | powder | 0.31 |
| $Ca(BrO_3)_2$ | powder | 0.65 |
| $Ca(IO_3)_2 \cdot H_2O$ | powder | 0.93 |

In this batch, $Ca(ClO)_2$ is about 0.025 mol %, $Ca(BrO_3)_2$ is about 0.025 mol %, $Ca(IO_3)_2$ monohydrate is about 0.025 mol %, and $SnO_2$ is about 0.07 mol %. The batch was mixed and melted as in Example 3.

Example 5

Combination of Bromate and Oxyhalide as a Fining Package

A batch was prepared with the following constituents:

TABLE 5

| Compound | Form | Mass (g) |
| --- | --- | --- |
| $SiO_2$ | 120 mesh sand | 366 |
| $Al_2O_3$ | 325 mesh powder | 96.23 |
| $B(OH)_3$ | technical grade powder | 107 |
| MgO | powder | 0.67 |
| $CaCO_3$ | crushed limestone | 80.6 |
| $SrCO_3$ | reagent powder | 6.55 |
| $SnO_2$ | powder | 0.93 |
| $Ca(ClO)_2$ | powder | 0.31 |
| $Ca(BrO_3)_2$ | powder | 1.3 |

In this batch, $Ca(ClO)_2$ is about 0.025 mol %, $Ca(BrO_3)_2$ is about 0.050 mol %, and $SnO_2$ is about 0.07 mol %. The batch was mixed and melted as in Example 3.

Example 6

Combination of Oxyhalides and Fluorine as a Fining Package

A batch was prepared with the following constituents:

TABLE 6

| Compound | Form | EXAMPLE 6A: Mass (g) |
|---|---|---|
| $SiO_2$ | 120 mesh sand | 382 |
| $Al_2O_3$ | 325 mesh powder | 100.5 |
| $B(OH)_3$ | technical grade powder | 112 |
| MgO | powder | 0.69 |
| $CaCO_3$ | crushed limestone | 84 |
| $SrCO_3$ | reagent powder | 6.83 |
| $SnO_2$ | powder | 0.97 |
| $Ca(ClO)_2$ | powder | 0.25 |
| $Ca(BrO_3)_2$ | Powder | 0.51 |
| $Ca(IO_3)_2 \cdot H_2O$ | Powder | 0.74 |
| $CaF_2$ | Powder | 0.13 |

In this batch, $Ca(ClO)_2$ is about 0.019 mol %, $Ca(BrO_3)_2$ is about 0.019 mol %, $Ca(IO_3)_2$ hydrate is about 0.019 mol %, $CaF_2$ is 0.018 mol %, and $SnO_2$ is about 0.07 mol %. The batch was mixed and melted as in Example 3.

Example 7

Combination of Oxyhalides and Halide as a Fining Package

Batches were prepared with the following constituents:

TABLE 7

| | | EXAMPLE | |
|---|---|---|---|
| Compound | Form | 7A: Mass (g) | 7B: Mass (g) |
| $SiO_2$ | Powder | 806.71 | 804.33 |
| $Al_2O_3$ | 325 mesh powder | 22.15 | 22.05 |
| $H_3BO_3$ | Powder, technical grade | 230.22 | 229.51 |
| $Na_2CO_3$ | Soda ash, powder | 64.73 | 64.74 |
| $K_2CO_3$ | Powder | 8.68 | 8.68 |
| $Ca(ClO)_2$ | Powder | 0 | 0.44 |
| $Ca(BrO_3)_2$ | Powder, hydrate | 0 | 0.90 |
| $Ca(IO_3)_2$ | Powder, hydrate | 0 | 1.30 |
| $CaF_2$ | Powder | 0 | 0.23 |
| Seeds/$in^3$ | | 70,636 | 36,450 |

TABLE 7-continued

| | | EXAMPLE | |
|---|---|---|---|
| Compound | Form | 7A: Mass (g) | 7B: Mass (g) |
| Volume Scanned, $in^3$ | | 0.0454 | 0.2043 |

In these batches, $Ca(ClO)_2$, $Ca(BrO_3)_2$, $Ca(IO_3)_2$, and $CaF_2$ were about 0.019 mol %. The batch was Turbula mixed then melted in uncovered Pt crucibles at 1600° C. for about 2 hours. The glasses were annealed in the crucible and a sample for seed counting was core drilled out. This piece was then made into a sample about 3" long×1.5" wide×1 cm thick with a 150 grit fine grind finish or a polished finish. Exact sample size depended on the amount of glass in the crucible. The seed counts were determined using a Jacobian Technologies custom built instrument called an Automated Depth-Focusing Microscope for Inclusion Mapping along with a Nikon SMZ 800 microscope and the results are included in the table above. The volume scanned is not the same for each sample because the volume had to be decreased when numerous seeds were present, otherwise the computer system crashed.

Example 8

Combination of oxyhalides and Halide as a Fining Package

Batches were prepared with the following constituents:

TABLE 8

| | | EXAMPLE | | | |
|---|---|---|---|---|---|
| Compound | Form | 8A: Mass (g) | 8B: Mass (g) | 8C: Mass (g) | 8D: Mass (g) |
| $SiO_2$ | Powder | 584.71 | 578.30 | 584.73 | 584.77 |
| $Al_2O_3$ | 325 mesh powder | 166.70 | 164.91 | 166.71 | 166.72 |
| $H_3BO_3$ | Technical grade powder | 151.29 | 149.70 | 151.29 | 151.29 |
| MgO | Powder | 6.98 | 6.89 | 6.99 | 7.02 |
| $CaCO_3$ | Crushed limestone | 78.01 | 77.27 | 76.90 | 73.56 |
| $SrCO_3$ | Powder | 25.85 | 25.58 | 25.85 | 25.85 |
| $BaCO_3$ | Powder | 124.14 | 122.71 | 124.14 | 124.14 |
| $As_2O_5$ | Powder | 0 | 12.81 | 0 | 0 |
| $Ca(ClO)_2$ | Powder | 0 | 0 | 0.51 | 0 |
| $Ca(BrO_3)_2$ | Powder, hydrate | 0 | 0 | 1.06 | 0 |
| $Ca(IO_3)_2$ | Powder, hydrate | 0 | 0 | 1.45 | 11.64 |
| $CaF_2$ | Powder | 0 | 0 | 0.14 | 1.14 |
| Seeds/$in^3$ | | 4,716 | 985 | 699 | 1,330 |
| Volume, $in^3$ | | 0.1889 | 0.3149 | 0.3149 | 0.3112 |

In these batches, $Ca(ClO)_2$, $Ca(BrO_3)_2$, $Ca(IO_3)_2$, and $CaF_2$ are about 0.019 mol % for 8C and $Ca(IO_3)_2$ and $CaF_2$ are 0.2 mol % and 0.1 mol %, respectively, for 8D. The samples were melted and prepared and the seed counts determined as described in Example 7.

Example 9

Combination of Oxyhalides and Halide as a Fining Package

Batches were prepared with the following constituents:

TABLE 9

| Compound | Form | 9A: Mass (g) | 9B: Mass (g) | 9C: Mass (g) | 9D: Mass (g) |
|---|---|---|---|---|---|
| $SiO_2$ | Powder | 635.51 | 641.32 | 641.33 | 641.38 |
| $Al_2O_3$ | 325 mesh powder | 163.49 | 164.99 | 164.99 | 165.01 |
| $H_3BO_3$ | Technical grade powder | 183.58 | 185.35 | 185.35 | 185.35 |
| MgO | Powder | 0 | 0 | 0 | 0.03 |
| $CaCO_3$ | Crushed limestone | 144.39 | 145.69 | 144.39 | 140.87 |
| $SrCO_3$ | Reagent powder | 11.51 | 11.66 | 11.66 | 11.66 |
| $BaCO_3$ | Powder | 0.80 | 0.80 | 0.80 | 0.80 |
| $SnO_2$ | Powder | 0.50 | 0.50 | 0.50 | 0.50 |
| $As_2O_5$ | Powder | 10.48 | 0 | 0 | 0 |
| $Ca(ClO)_2$ | Powder | 0 | 0 | 0.51 | 0 |
| $Ca(BrO_3)_2$ | Powder, hydrate | 0 | 0 | 1.06 | 0 |
| $Ca(IO_3)_2$ | Powder, powder | 0 | 0 | 1.45 | 12.36 |
| $CaF_2$ | powder | 0 | 0 | 0.28 | 1.28 |
| Seeds/in$^3$ | | 6,886 | 62,068 | 5,721 | 2,009 |
| Volume, in$^3$ | | 0.1889 | 0.0454 | 0.1889 | 0.1889 |

In these batches, $Ca(ClO)_2$, $Ca(BrO_3)_2$, $Ca(IO_3)_2$, and $CaF_2$ are about 0.019 mol % for 9C and $Ca(IO_3)_2$ and $CaF_2$ are 0.2 mol % and 0.1 mol %, respectively, for 9D. $SnO_2$ is about 0.02 mol %. The samples were melted and prepared and the seed counts determined as described in Example 7.

Example 10

Combination of Oxyhalide and Halide as a Fining Package

Batches were prepared with the following constituents:

TABLE 10

| Compound | Form | 10A: Mass (g) | 10B: Mass (g) |
|---|---|---|---|
| $SiO_2$ | Powder | 585.84 | 641.37 |
| $Al_2O_3$ | 325 mesh powder | 167.02 | 164.98 |
| $H_3BO_3$ | Powder | 151.51 | 185.61 |
| MgO | Powder | 6.98 | 0 |
| $CaCO_3$ | Crushed limestone | 78.14 | 145.69 |
| $SrCO_3$ | Powder | 19.50 | 4.75 |
| $BaCO_3$ | Powder | 124.40 | 0.92 |
| $SnO_2$ | Powder | 0 | 0.50 |
| $Sr(IO_3)_2$ | Powder, hydrate | 12.66 | 13.51 |
| $SrF_2$ | Powder | 1.82 | 1.94 |
| Seeds/in$^3$ | | 8,389 | 9,729 |
| Volume, in$^3$ | | 0.1845 | 0.1889 |

In these batches, $Sr(IO_3)_2$ and $SrF_2$ are about 0.2 mol % and 0.1 mol % respectively. The glasses were prepared and the seed counts determined the same as in Example 7.

Example 11

Combination of Oxyhalide and Halide as a Fining Package

Batches were prepared with the following constituents:

TABLE 11

| Compound | Form | 11A: Mass (g) | 11B: Mass (g) | 11C: Mass (g) |
|---|---|---|---|---|
| $SiO_2$ | Powder | 489.80 | 495.43 | 495.48 |
| $Al_2O_3$ | 325 mesh powder | 109.47 | 110.67 | 110.67 |
| $H_3BO_3$ | Powder | 253.81 | 256.83 | 257.19 |
| $SrCO_3$ | Powder | 1.41 | 1.36 | 0 |
| $BaCO_3$ | Powder | 319.02 | 322.55 | 322.56 |
| $As_2O_5$ | Powder | 13.16 | 0 | 0 |
| $Sr(IO_3)_2$ | Powder, hydrate | 0 | 0 | 11.82 |
| $SrF_2$ | Powder | 0 | 0 | 1.70 |
| Seeds/in$^3$ | | 1,003 | 5,580 | 1,132 |
| Volume, in$^3$ | | 0.2124 | 0.2124 | 0.1025 |

These batches were Turbula mixed, melted in un-covered Pt crucibles at 1450° C. for 2 hours, and then annealed in the crucibles. Seed count samples were prepared and seed counts determined the same as in Example 7.

Example 12

Combination of Oxyhalides and Halide as a Fining Package

Batches were prepared with the following constituents:

TABLE 12

| Compound | Form | 12A: Mass (g) | 12B: Mass (g) | 12C: Mass (g) |
|---|---|---|---|---|
| $SiO_2$ | Powder | 495.79 | 495.80 | 495.84 |
| $Al_2O_3$ | Powder | 130.48 | 130.49 | 130.50 |
| $H_3BO_3$ | Powder, tech grade | 9.65 | 9.65 | 9.65 |
| MgO | Powder | 30.02 | 30.02 | 30.05 |
| $CaCO_3$ | Crushed limestone | 6.45 | 5.41 | 2.59 |
| $Na_2CO_3$ | Powder | 183.37 | 183.37 | 183.37 |
| $K_2CO_3$ | Powder | 42.38 | 42.38 | 42.38 |
| $Ca(ClO)_2$ | Powder | 0 | 0.41 | 0 |
| $Ca(BrO_3)_2$ | Powder, hydrate | 0 | 0.84 | 0 |
| $Ca(IO_3)_2$ | Powder, hydrate | 0 | 1.16 | 10.47 |

TABLE 12-continued

|  |  | EXAMPLE | | |
|---|---|---|---|---|
| Compound | Form | 12A: Mass (g) | 12B: Mass (g) | 12C: Mass (g) |
| $CaF_2$ | Powder | 0 | 0.23 | 1.02 |
| Seeds/in$^3$ | | 20,393 | 4,526.5 | 1,772 |
| Volume, in$^3$ | | 0.2746 | 0.2746 | 0.1501 |

In these batches, $Ca(ClO)_2$, $Ca(BrO_3)_2$, $Ca(IO_3)_2$, and $CaF_2$ are about 0.019 mol % for 12B and $Ca(IO_3)_2$ and $CaF_2$ are 0.2 mol % and 0.1 mol %, respectively, for 12C. The glasses were prepared and the seed counts determined as in Example 7.

Example 13

Frit Delivery

When a halide or sulfate fining agent is added, an alternative to adding the halide or sulfate fining agent as an individual batch material is to make a frit containing one or more of the halide or sulfate and deliver the frit composition to the batch. The frit may be a glass or a crystalline material as long as there is retained halide or sulfur.

Frits 13A-J were prepared with the following constituents and melt conditions:

Examples of Glass Based Frits Containing Halide

TABLE 13

|  |  | EXAMPLE | | | | |
|---|---|---|---|---|---|---|
| Compound | Form | 13A: Mass, g | 13B: Mass, g | 13C: Mass, g | 13D: Mass, g | 13E: Mass, g |
| $B_2O_3$ | Powder | 23.80 | 70.4 | 514.3 | 543.13 | 181.50 |
| CaO | Powder | 19.98 | 176.6 | 174.2 | 165.09 | 156.65 |
| MgO | Powder | 0 | 0 | 0 | 0 | 0 |
| $SiO_2$ | Powder | 0 | 0 | 0 | 61.92 | 67.14 |
| $CaBr_2$ | Powder | 46.33 | 614 | 263.4 | 0 | 558.36 |
| $CaF_2$ | NA | 0 | 0 | 0 | 229.86 | 36.35 |
| Retained Br, wt % | NA | 27.0 | 51.9 | 12.0 | 0 | 40.8 |
| Retained F, wt % | NA | 0 | 0 | 0 | 7.24 | 2.01 |
| Melt Conditions | Temperature/ Crucible/Time | 1200° C./ Quartz/ 1 hr | 1200° C./ Quartz/ 1 hr | 1200° C./ Quartz/ 1 hr | 1200° C./ Pt/1 hr | 1200° C./ Pt/1 hr |

Examples of Crystalline Based Frit Containing Halide

TABLE 14

|  |  | EXAMPLE | |
|---|---|---|---|
| Compound | Form | 13F: Mass, g | 13G: Mass, g |
| $B_2O_3$ | Powder | 69.22 | 83.35 |
| CaO | Powder | 334.55 | 215.81 |
| $CaBr_2$ | Powder | 596.23 | 700.84 |
| Retained Br, wt % | NA | 40.6 | 54.10 |
| Melt Conditions | Temperature/ Crucible/time | 1200° C./ Quartz/1 hr | 1200° C./ Pt/1 hr |

Examples of Glass Based Frit Containing Sulfur

TABLE 15

|  |  | EXAMPLE | |
|---|---|---|---|
| Compound | Form | 13H: Mass, g | 13I: Mass, g |
| $B_2O_3$ | Powder | 260.37 | 231.92 |
| CaO | Powder | 69.91 | 70.50 |
| $CaSO_4$ | Powder | 169.72 | 171.14 |
| $SiO_2$ | Powder | 0 | 26.44 |
| Retained S, wt % | NA | 1.58 | 0.93 |
| Melt Conditions | Temperature/ Crucible/time | 1200° C./ Pt/1 hr | 1200° C./ Pt/1 hr |

Examples of Crystalline Based Frit Containing Sulfur

TABLE 16

|  |  | EXAMPLE 13J: |
|---|---|---|
| Compound | Form | Mass, g |
| B2O3 | Powder | 115.52 |
| CaO | Powder | 99.70 |
| $CaSO_4$ | Powder | 242.04 |
| $SiO_2$ | Powder | 42.73 |
| Retained S, wt % | NA | 11.69 |
| Melt Conditions | Temperature/ Crucible/time | 1200° C./ Pt/1 hr |

Both the glass and the crystalline materials contain silica either from crucible contamination or from batch. Several of the glasses, although not all, require a level of $SiO_2$ (approximately 0.59 to 13.10 wt %) in order to form a glass.

Various modifications and variations can be made to the compositions, articles, devices, and methods described herein. Other aspects and embodiments of the compositions, articles, devices, and methods described herein will be apparent from consideration of the specification and practice of the compositions, articles, devices, and methods disclosed herein. It is intended that the specification and examples be considered as exemplary.

What is claimed is:

1. A method for producing a silicate glass comprising
   forming a silicate glass batch;
   melting and fining the silicate glass batch; and
   forming the silicate glass,
   wherein:
   (i) the fining is performed with a sufficient amount of a fining agent comprising one or more oxyhalide compounds or a hydrate thereof; and (ii) the silicate glass batch comprises source materials that upon melting form a glass having a composition, expressed in terms of weight percentage in terms of oxides, comprising: 56-85% $SiO_2$; 0-16% $B_2O_3$; 8-25% $Al_2O_3$, 0-25% $A_2O$, and 0-25% $ZO$, where A represents alkali metals and Z represents alkaline earth metals.

2. The method of claim 1, wherein each of the one or more oxyhalide compounds or a hydrate thereof is independently of the formula $R_a(XO_p)_q \cdot r(H_2O)$, where $R_a$ is a cation; X is a halide of Cl, Br, or I; p is an integer and is the number of oxygen atoms in the oxyhalide compound; q is an integer and is equal to the valance state of $R_a$; and r is greater than or equal to 0 and is the number of waters of hydration in the oxyhalide compound.

3. The method of claim 1, wherein the fining agent further comprises one or more halide compounds or a hydrate thereof.

4. The method of claim 3, wherein the halide compound is introduced into the batch as part of a frit material.

5. The method of claim 3, wherein each of the one or more oxyhalide compounds or a hydrate thereof is independently of the formula $R_a(XO_p)_q \cdot r(H_2O)$, where $R_a$ is a cation; X is a halide of Cl, Br, or I; p is an integer and is the number of oxygen atoms in the oxyhalide compound; q is an integer and is equal to the valance state of $R_a$; and r is greater than or equal to 0 and is the number or waters of hydration in the oxyhalide compound and wherein each of the one or more halide compounds or a hydrate thereof is independently of the formula $R_b(Y)_t \cdot u(H_2O)$, where $R_b$ is a cation; Y is a halide of F, Cl, Br, or I; t is an integer and is equal to the valance state of $R_b$; and u is greater than or equal to 0 and is the number of waters of hydration in the halide compound; wherein the cations $R_a$ and $R_b$ can be the same or different and the halides X and Y can be the same or different.

6. The method of claim 1, wherein the fining agent comprises two or more oxyhalide compounds or a hydrate thereof.

7. The method of claim 3, wherein the fining agent comprises two or more oxyhalide compounds or a hydrate thereof and one or more halide compounds or a hydrate thereof.

8. The method of claim 1, wherein the one or more oxyhalide compounds or a hydrate thereof independently comprises a hypochlorite, chlorite, bromate, or iodate of an alkali metal or alkaline earth metal or a hydrate thereof.

9. The method of claim 3, wherein the one or more oxyhalide compounds or a hydrate thereof independently comprises a hypochlorite, chlorite, bromate, or iodate of an alkali metal or alkaline earth metal or a hydrate thereof and the one or more halide compounds or a hydrate thereof independently comprises a fluoride, chloride, bromide or iodide of an alkali metal, alkaline earth metal, or aluminum or a hydrate thereof.

10. A method for producing a silicate glass comprising
forming a silicate glass batch;
melting and fining the silicate glass batch; and
forming the silicate glass,
wherein the fining is performed with a fining agent and the fining agent comprises (i) the combination of a hypochlorite or a hydrate thereof and a bromate or a hydrate thereof or (ii) the combination of a hypochlorite or a hydrate thereof and an iodate or a hydrate thereof.

11. The method of claim 3, wherein the fining agent comprises (i) the combination of a hypochlorite or a hydrate thereof and a bromate or a hydrate thereof and at least one halide or hydrate thereof of a chloride, fluoride, or bromide or (ii) the combination of a hypochlorite or a hydrate thereof and an iodate or a hydrate thereof and at least one halide or hydrate thereof of a chloride, fluoride, or bromide.

12. The method of claim 3, wherein the fining agent comprises an oxyhalide and a fluoride; an oxyhalide and a bromide; or an oxyhalide and a chloride; or independently the hydrate of any thereof.

13. The method of claim 12, wherein the oxyhalide comprises a hypochlorite, an iodate, or a combination thereof, or a hydrate thereof.

14. The method of claim 3, wherein the fining agent comprises a hypochlorite, an iodate, a bromate, and a fluoride, or independently a hydrate of any thereof.

15. A method for producing a silicate glass comprising
forming a silicate glass batch;
melting and fining the silicate glass batch; and
forming the silicate glass, wherein the fining is performed with a sufficient amount of a fining agent comprising one or more oxyhalide compounds or a hydrate thereof, and wherein the silicate glass is substantially free of alkali metals.

16. The method of claim 1, wherein the one or more oxyhalide compounds or a hydrate thereof is added to the silicate glass batch prior to melting.

17. The method of claim 1, wherein the amount of the fining agent is controlled such that the silicate glass has a residual halide in the amount of at least 50 ppm.

18. The method of claim 1, wherein the silicate glass has a defect level of less than or equal to one gaseous inclusion greater than 50 microns per one pound of consecutively formed silicate glass.

19. The method of claim 1, wherein the silicate glass has a defect lavel of less than or equal to one gaseous inclusion greater than 50 microns per 20 pounds of consecutively formed silicate glass.

\* \* \* \* \*